(12) United States Patent
Mo et al.

(10) Patent No.: US 7,653,141 B2
(45) Date of Patent: Jan. 26, 2010

(54) MULTI-BAND OFDM UWB COMMUNICATION SYSTEMS HAVING IMPROVED FREQUENCY DIVERSITY

(75) Inventors: Shaomin Samuel Mo, Monmouth Junction, NJ (US); Alexander D. Gelman, Smallwood, NY (US)

(73) Assignee: Panasonic Corporation, Osaka (JP)

( * ) Notice: Subject to any disclaimer, the term of this patent is extended or adjusted under 35 U.S.C. 154(b) by 658 days.

(21) Appl. No.: 11/395,084

(22) Filed: Mar. 31, 2006

(65) Prior Publication Data

US 2007/0230594 A1    Oct. 4, 2007

(51) Int. Cl.
 H04K 1/10   (2006.01)
 H04L 5/12   (2006.01)
 H04L 27/10  (2006.01)
 H04L 27/00  (2006.01)
 H04B 7/10   (2006.01)
 H04B 1/10   (2006.01)

(52) U.S. Cl. ............... 375/260; 375/261; 375/272; 375/299; 375/247; 375/249

(58) Field of Classification Search ......... 375/260–261, 375/272, 299, 347, 349
See application file for complete search history.

(56) References Cited

U.S. PATENT DOCUMENTS

| | | | | |
|---|---|---|---|---|
| 6,434,188 | B1 * | 8/2002 | Hwang et al. | 375/222 |
| 6,922,388 | B1 * | 7/2005 | Laroia et al. | 370/208 |
| 7,218,948 | B2 * | 5/2007 | Laroia et al. | 455/522 |
| 2004/0047370 | A1 * | 3/2004 | Pessoa et al. | 370/526 |
| 2004/0057530 | A1 * | 3/2004 | Tarokh et al. | 375/267 |
| 2004/0199846 | A1 * | 10/2004 | Matsumoto et al. | 714/748 |
| 2004/0255231 | A1 * | 12/2004 | Shen et al. | 714/801 |
| 2005/0013379 | A1 * | 1/2005 | Duvaut et al. | 375/259 |
| 2005/0018702 | A1 * | 1/2005 | Chen et al. | 370/431 |
| 2005/0193307 | A1 * | 9/2005 | Wengerter et al. | 714/749 |
| 2006/0269010 | A1 * | 11/2006 | Betts | 375/265 |

OTHER PUBLICATIONS

Vahid Tarokh, Hamid Jafarkhani, A.R. Calderbank, Space-Time Block Codes from Orthogonal Designs, IEEE Transactions on Information Theory, vol. 45, No. 5, Jul. 1999, 1456-1467.

Vahid Tarokh, Nambi Seshadri, A.R. Calderbank, Space-Time Codes for High Data Rate Wireless Communication: Performance Criterion and Code Construction, IEEE Transactions on Information Theory, vol. 44, No. 2, Mar. 1998, pp. 744-765.

S. M. Alamouti; A Simple Transmit Diversity Technique For Wireless Communications; IEEE Journal on Select Areas in Communications, pp. 1451-1458, vol. 16 No. 8, Oct. 1998.

(Continued)

*Primary Examiner*—Mohammad H Ghayour
*Assistant Examiner*—Sarah Hassan
(74) *Attorney, Agent, or Firm*—RatnerPrestia

(57) ABSTRACT

Methods and apparatus for transmitting and receiving symbols in a communication system having a plurality of frequency bands are provided. A first symbol is transmitted on a first tone using a first constellation mapping and a second symbol is transmitted on a second tone using a second constellation mapping different from the first constellation mapping. The first symbol is retransmitted on the second tone using the second constellation mapping and the second symbol is retransmitted on the first tone using the first constellation mapping. The first and second symbols are detected from a combination of the received transmitted and retransmitted first and second signals.

15 Claims, 8 Drawing Sheets

OTHER PUBLICATIONS

Multiband OFDM Physical Layer Specification; Release 0.99, Dec. 14, 2004; Copyright © 2004 by Multi OFDM Alliance Special Interest Group, pp. 1-113.

Internet; Standard ECMA-368, 1$^{st}$ Edition Dec. 2005; High Rate Ultra Wideband PHY and MAC Standard; www.ecma-international.org/publications/files/ECMA-ST/ECMA-368.pdf, pp. 48-46.

* cited by examiner

MULTI-BAND OFDM UWB COMMUNICATION SYSTEMS HAVING IMPROVED FREQUENCY DIVERSITY

FIELD OF THE INVENTION

The present invention relates to the field of wireless communications and, more particularly, to methods and apparatus for symbol spreading to improve frequency diversity for multi-band communication systems.

BACKGROUND OF THE INVENTION

Wireless personal area networks (WPANs) provide wireless short-range connectivity for electronic devices such as audio/video devices within a home. The Institute of Electrical and Electronics Engineers (IEEE) 802.15 High Rate Alternative PHY Task Group (TG3a) for WPAN is working to develop a higher speed physical (PHY) layer enhancement to IEEE proposed standard P802.15.3™—Draft Standard for Telecommunications and Information Exchange Between Systems (referred to herein as the proposed IEEE standard). Presently, Ultra Wideband (UWB) technology is under consideration by the Institute of Electrical and Electronic Engineers (IEEE) as an alternative physical layer technology. UWB technology, in general, uses base-band pulses of very short duration to spread the energy of transmitted signals very thinly from near zero to several GHz.

In particular, Multi-Band Orthogonal Frequency Division Multiplexing (MB-OFDM) has been proposed for the IEEE standard due to its spectrally efficiency, inherent robustness against narrowband interference, and robustness to multi-path fading, which allows a receiver to capture multi-path energy more efficiently. The inverse fast Fourier transform/fast Fourier transform (IFFT/FFT) operation ensures that sub-carriers do not interfere with each other. OFDM signals have very good in-band and stop-band performance because they have generally flat power spectral density (PSD) in-band and a sharp cut off in the stop-band.

In MB-OFDM, the UWB frequency spectrum, which covers 7.5 GHz in the 3.1 GHz to 10.6 GHz frequency band, is divided into 14 bands, each occupying 528 MHz of bandwidth. Each band includes 128 sub-carriers of 4 MHz bandwidth each. Information is transmitted using OFDM modulation on each band. MB-OFDM may use coding such that information bits are interleaved across various bands to exploit frequency diversity and provide robustness against multi-path interference. MB-OFDM, however, does not offer sufficient frequency diversity for higher code rates (i.e., low redundancies). Typical techniques to increase frequency diversity in MB-OFDM systems, however, often have a relatively high level of complexity, which adds to the cost of implementing such techniques.

SUMMARY OF THE INVENTION

The present invention is embodied in methods and apparatus for transmitting symbols in a communication system having a plurality of frequency bands where each frequency band includes a plurality of tones. Embodiments of the present invention include transmitting a first symbol on a first tone using a first constellation mapping and a second symbol on a second tone using a second constellation mapping different from the first constellation mapping. The first and second symbols are selected from among the symbols. The first and second tones are selected from among the plurality of tones. The methods and apparatus further include retransmitting the first symbol on the second tone using the second constellation mapping and the second symbol on the first tone using the first constellation mapping.

The present invention is further embodied in methods and apparatus for detecting symbols in a communication system having a plurality of frequency bands where each frequency band including a plurality of tones. The detection methods and apparatus include demapping a first set of signals corresponding to first and second symbols mapped using respective first and second constellation mappings. The second constellation mapping is different from the first constellation mapping. The first and second symbols are selected from among the symbols. The detection methods and apparatus further include demapping a second set of signals corresponding to the first and second symbols mapped using the respective second and first constellation mappings. The detection methods and apparatus also include combining the first and second sets of demapped signals to form a combined signal and detecting the first and second symbols from the combined signal.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover in the drawings, common numerical references are used to represent like features/elements. Included in the drawing are the following figures.

DETAILED DESCRIPTION OF THE INVENTION

UWB communication systems, are generally known in the art, for example, as illustrated and disclosed in U.S. application Ser. No. 10/751,366 invented by the Inventor of this application, and entitled "METHOD AND APPARATUS FOR RECOVERING DATA IN A RECEIVED CONVOLUTION-ENCODED DATA STREAM," PCT International Application No. PCT/US2005/041164, invented by the Inventor of this application, entitled "TRANSMISSION METHODS AND APPARATUS IN MULTI-BAND OFDM WIDEBAND SYSTEMS" and in an industry association standard entitled "Standard ECMA368, High Rate Ultra Wideband PHY and MAC Standard," published December 2005.

The present invention provides spreading schemes that treat tones in a MB-OFDM UWB system as antennas such that time-space coding used in Multiple Input Multiple Output (MIMO) systems may be applied to MB-OFDM UWB systems. In an exemplary embodiment, first and second symbols are mapped using respective first and second constellation mappings to first and second N-quadrature amplitude modulation (QAM) constellations which modulate corresponding first and second tones. The symbols are then retransmitted by switching the N-QAM constellations. Analysis shows that the exemplary spreading schemes can achieve a full frequency diversity gain as compared with the conventional MB-OFDM system. The exemplary spreading schemes can be used in other multi-carrier wireless communication systems to improve frequency diversity.

Figure 1:
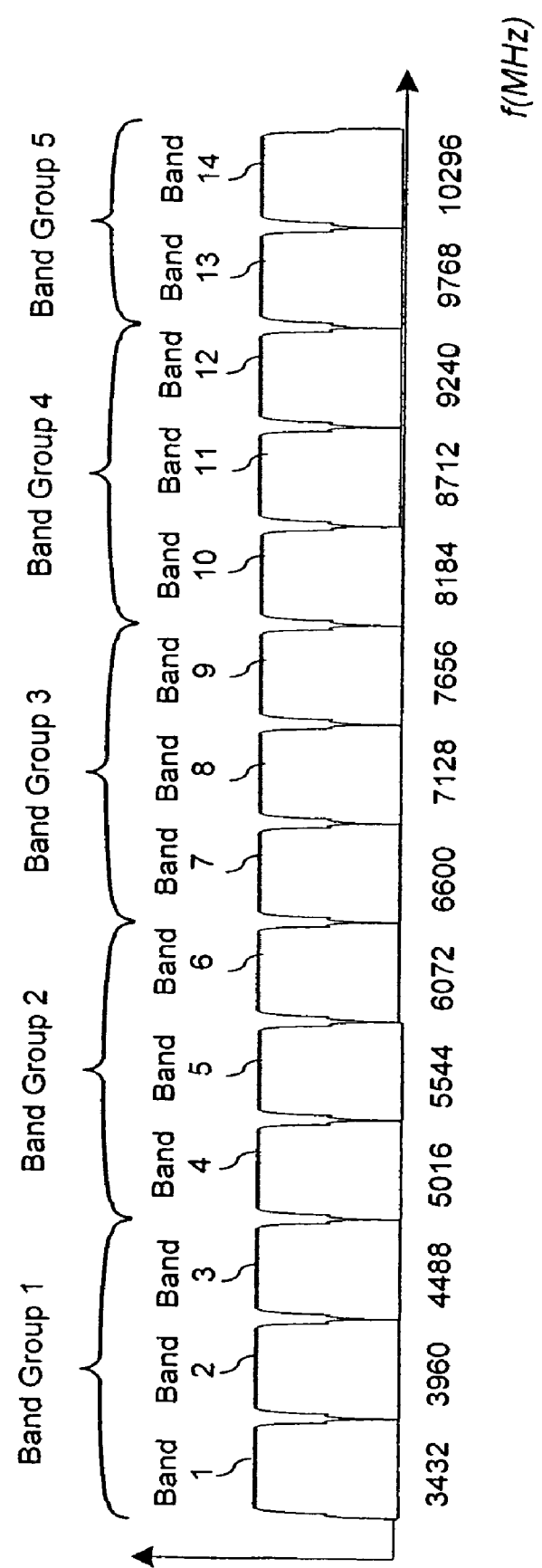
FIG. 1 (Prior Art) is a conceptual representation of a multi-band spectrum allocation for a UWB communication system.

FIG. 1 is a conceptual representation of a multi-band spectrum allocation for a UWB communication system which is in accordance with FCC mandates for such systems. The UWB spectrum of 7.5 GHz in the 3.1 GHz to 10.6 GHz frequency band is divided into 14 bands and each of bands 1-14 occupies 528 MHz of bandwidth. Bands 1-14 are grouped into band groups 1-5, each consisting of 2 or 3 bands. Bands 1-12 are grouped into band groups 1-4, each band group consisting of 3 bands. Bands 13-14 are grouped into band group 5 consisting of 2 bands. Support for band group 1 is mandatory for devices using UWB communication while it is optional for band groups 2-5.

Information may be transmitted by UWB devices using OFDM modulation on each band of the UWB spectrum. Information bits are typically interleaved across various bands (described further below) to exploit frequency diversity and provide robustness against multi-path interference.

OFDM typically uses quadrature phase shift keying (QPSK) on each tone. Because of the simplicity of this modulation scheme, only 4-/5-bit analog to digital converter (ADC) is needed to maintain a reasonable performance. The requirement of fewer bits for the ADC allows for a less complex FFT/FFT implementation and, thus, less power is consumed than in other OFDM-based wireless systems such as IEEE 802.11a. Due to the QPSK modulation operation on each tone, channel distortion can be described as phase rotation and amplitude attenuation on each carrier. To handle such distortion, one-tap equalizers may be used on each tone.

In the MB-OFDM system, diversity in the channel may be employed through the use of frequency diversity and time diversity. These two diversities typically apply to data rates lower than 320 Mbps. For data rate of 320 Mbps and higher, neither of the diversities may be used. Although a data rate of 320 Mbps is illustrated, it is contemplated that other data rates, for example, 53 Mbps, 80 Mbps, 106 Mbps, 160 Mbps, 200 Mbps, 400 Mbps and 480 Mbps, or any other suitable data rate may be used.

Dual-Carrier Modulation (DCM) is considered by the proposed IEEE standard for data rates greater than or equal to 320 Mbps in order to use frequency diversity. With DCM, 4 information bits, or two symbols, are spread over two tones using an operation such as shown in equation 1:

$$\begin{bmatrix} y_n \\ y_{n+50} \end{bmatrix} = \frac{1}{\sqrt{10}} \begin{bmatrix} 2 & 1 \\ 1 & -2 \end{bmatrix} \begin{bmatrix} x_{a(n)} + jx_{a(n)+50} \\ x_{a(n)+1} + jx_{a(n)+51} \end{bmatrix}, \quad (1)$$

$$n = 0, 1, 2, \ldots, 49$$

where x takes value of 1 or −1 and $$a(n) = \begin{cases} 2n & n = 0, 1, 2, \ldots, 24 \\ 2n + 50 & n = 25, 26, \ldots, 49 \end{cases} \quad (2)$$

The operation shown in equation 1 maps 4 information bits onto two tones with different patterns such that each tone has a 16-QAM constellation. Because each information bit is transmitted over two tones, DCM may outperform the conventional scheme where 4 information bits are commonly mapped onto 2 QPSK symbols and each symbol is transmitted over one tone.

The block of complex symbols $\{y_n\}$ is then further modulated using an OFDM modulation scheme. Table 1 gives the mapping of input bits $\{x_n\}$ to output symbols $\{y_n\}$. In Table 1, four bits are mapped to each symbols and each bit is mapped to two different symbols/tones. For example, bit 1 is modulated onto symbol/tones 1 and 51 along with bits 2, 51 and 52.

TABLE 1

Mapping of DCM

| Output (symbol) | Input (bits) | | | |
|---|---|---|---|---|
| 1 | 1 | 2 | 51 | 52 |
| 2 | 3 | 4 | 53 | 54 |
| . | . | . | . | . |
| . | . | . | . | . |
| . | . | . | . | . |
| 24 | 47 | 48 | 97 | 98 |
| 25 | 49 | 50 | 99 | 100 |
| 26 | 101 | 102 | 151 | 152 |
| 27 | 103 | 104 | 153 | 154 |
| . | . | . | . | . |
| . | . | . | . | . |
| . | . | . | . | . |
| 49 | 147 | 148 | 197 | 198 |
| 50 | 149 | 150 | 199 | 200 |
| 51 | 1 | 2 | 51 | 52 |
| 52 | 3 | 4 | 53 | 54 |
| . | . | . | . | . |
| . | . | . | . | . |
| . | . | . | . | . |
| 74 | 47 | 48 | 97 | 98 |
| 75 | 49 | 50 | 99 | 100 |
| 76 | 101 | 102 | 151 | 152 |
| 77 | 103 | 104 | 153 | 154 |
| . | . | . | . | . |
| . | . | . | . | . |
| . | . | . | . | . |
| 99 | 147 | 148 | 197 | 198 |
| 100 | 149 | 150 | 199 | 200 |

Figure 2A:
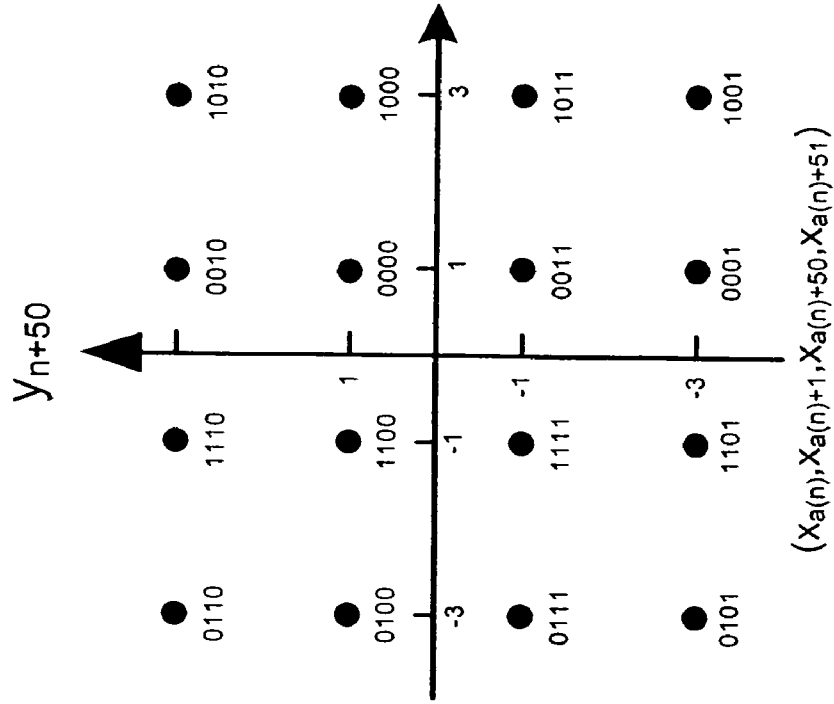
FIGS. 2A and 2B (Prior Art) are constellations of dual carrier modulation (DCM) according to a conventional method.
Figure 2B:
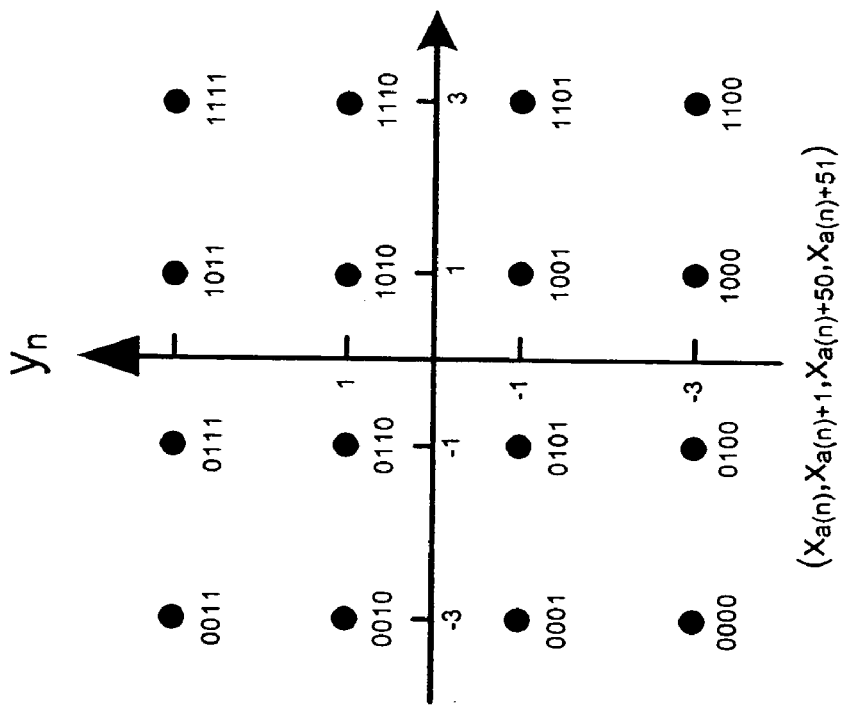

In equation (1), the value $\sqrt{10}$ is used to normalize the transmission power of 16-QAM. This can be described with reference to FIGS. 2A and 2B. These figures show constellations of DCM for complex symbols $y_n$ and $y_{n+50}$. In these figures, each symbol $(x_{a(n)}, x_{a(n)+1}, x_{a(n)+50}, x_{a(n)+51})$ is mapped onto one constellation point. In FIGS. 2A and 2B, '1/0' corresponds to '1/−1' in equation (1). As shown with reference to FIGS. 2A and 2B, equation (1) maps 4 bits onto a 16-QAM constellation. Assuming that the data is evenly and randomly distributed, a total energy in one quadrant may be determined by equation (3) as:

$$\Sigma = (3^2+3^2)+2(3^2+1^2)+(1^2+1^2)=40 \quad (3)$$

An average energy of one constellation point may be computed in equation (4) as:

$$\Sigma/4 = 10 \quad (4)$$

Time domain OFDM symbols may be transmitted across three consecutive sub-bands. By time-interleaving the symbols across sub-bands, a total average transmit power is spread over the three sub-bands. The effective total average transmit power is, therefore, equal to the average power per sub-band multiplied by the number of sub-bands.

Multiple UWB devices may operate in different piconets in a common coverage area. Piconets, sometimes referred to as personal area networks (PANs), are formed when at least two devices, such as a portable PC and a cellular phone, connect. The multiple connections among UWB devices are called a simultaneously operating piconet (SOP) in MB-OFDM. When these UWB devices are used in apartment buildings, it is highly probable that multiple overlapping SOPs are operating. One challenge for MB-OFDM systems dealing with interference caused by multiple SOPs that operate nearby. One method for minimizing interference among SOPs is to assign each SOP a different time-frequency code (TFC) (i.e., channel). The TFC may also be referred to as a time/frequency hopping scheme.

To support multiple SOPs and avoid interference, the coded data (i.e., symbols) is spread using the TFC. Typically, there are two types of TFCs used: one in which the symbols are interleaved over three bands, referred to as Time-Frequency Interleaving (TFI); and one in which the symbols are transmitted on a single band, referred to as Fixed Frequency Interleaving (FFI). Typically, each band group supports both TFCs.

The Combination of the band group and the TFC may uniquely define a band usage. A channel may be used to specify the TFC in a band group. Table 2 lists the TFCs in band group 1. Band Groups 1, 2, 3 and 4 contain channels 1-7, 8-14, 15-21 and 22-28, respectively. Table 3 lists the TFC in band group 5 containing channels 29-30. Support for both types of TFCs is mandatory, according to known Multi-Band OFDM Alliance (MBOA) or Wimedia Alliance Specifications.

TABLE 2

Time-Frequency Code in Band Group 1

| Channel Number | 3-band, Length 6 TFC | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |

TABLE 3

Time-Frequency Code in Band Group 5

| Channel Number | 2-band, Length 6 TFC | | | | | |
|---|---|---|---|---|---|---|
| 29 | 13 | 13 | 13 | 13 | 13 | 13 |
| 30 | 14 | 14 | 14 | 14 | 14 | 14 |

Figure 3:
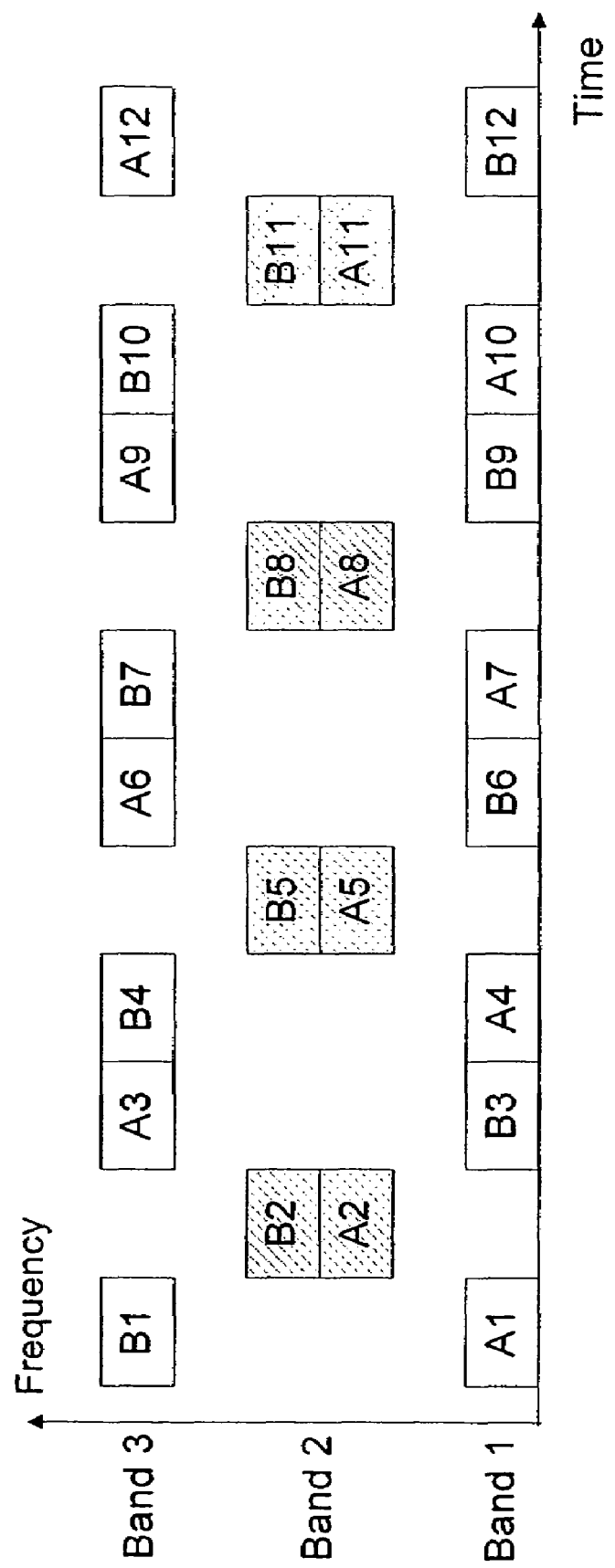
FIGS. 3 (Prior Art) is a timing diagram illustrating a conventional frequency hopping sequence for two devices.

FIG. 3 is a timing diagram illustrating a conventional frequency hopping sequence for two devices. The TFC defines number of bands and the order of the bands to nels have different orders of band usage. In FIG. 3, the letter the number following the letter denotes a symbol period. In this example, device A uses channel 1 and device B uses channel 2.

In a first symbol period T1, device A may communicate over frequency band 1 and device B may use frequency band 3. Because device A uses channel 1 which has TFC sequence (... 1, 2, 3, 1 ...), in the second symbol period T2, device A communicates over frequency band 2. Similarly, because device B uses channel 2 having TFC sequence (... 3, 2, 1, 3 ...), in the second symbol period device B communicates over frequency band 2. In a third symbol period T3, device A may communicate over frequency band 3, and device B may communicate over frequency band 1. As shown by the example in FIG. 3 and Tables 1 and 2, each channel may have a unique time/frequency hopping scheme. In this example, devices A and B may be involved in collisions at symbol periods T2, T5, T8 and T11.

For some information data rates, frequency-domain and time-domain spreading techniques may be used. Time-domain spreading involves transmitting the same information across two consecutive OFDM symbols. This technique may be used to maximize frequency-diversity and to improve UWB device performance in the presence of other non-coordinated devices.

Time-domain spreading typically provides a trade-off of the data rate for a desired performance. Time-domain spreading is therefore typically used for information data rates less than 200 Mbps. In time-domain spreading, symbols are transmitted twice. In the second OFDM symbol transmission, complex symbols are inverse positioned on the sub-carriers. The real and imaginary parts of the complex symbols are swapped and multiplied with a member of a pseudo-random sequence.

Figure 4:
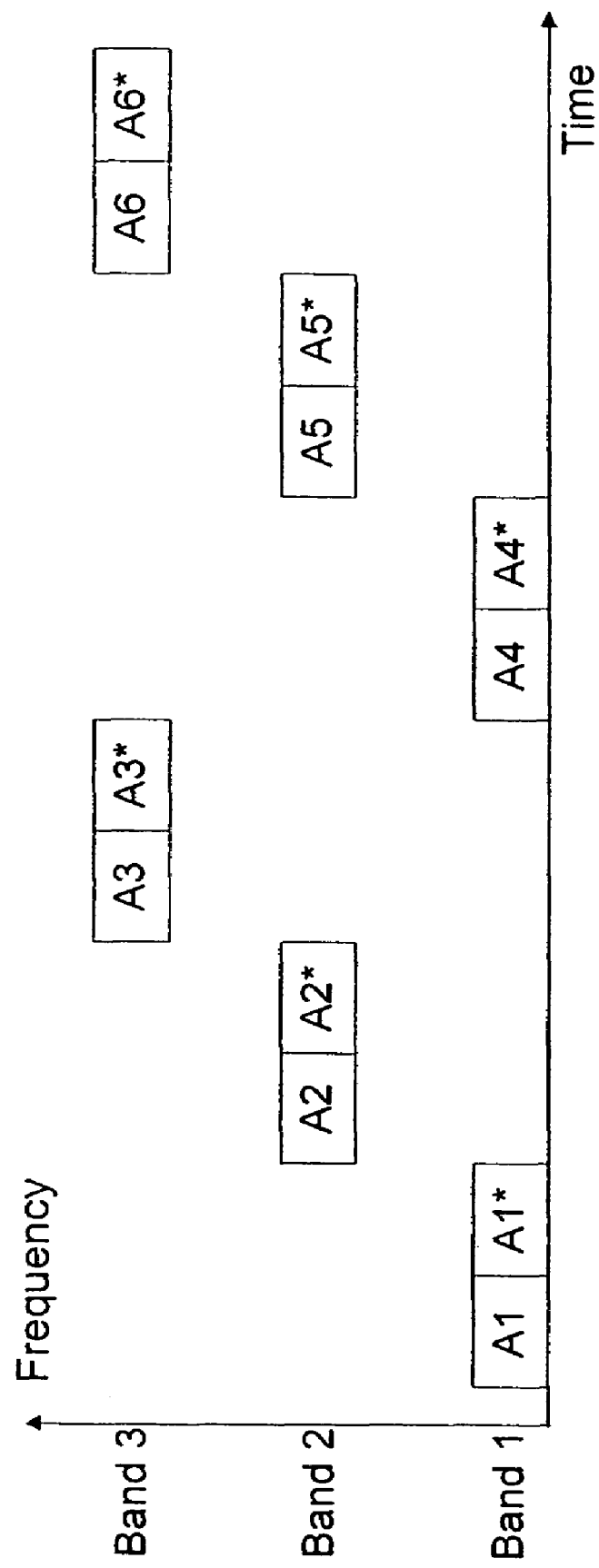
FIG. 4 (Prior Art) is a timing diagram illustrating a conventional frequency hopping sequence for a device using time-domain spreading.

FIG. 4 is a timing diagram illustrating a conventional frequency hopping sequence for a device using time-domain spreading. In this example, a device A uses channel 3 in a band group for the frequency-hopping sequence. In FIG. 4, the letter represents the device, the number following the letter represents the symbol number and * represents the complex conjugate operation. Each block represents a symbol. As shown by FIG. 4, every symbol is repeated on the same band. For example, symbols 1, 2, 3 are repeated on frequency bands 1, 2 and 3, respectively.

Space-Time Coding

Another known in the art technique that is robust to multipath fading with space diversity is Space-Time Coding (STC). A conventional two-branch transmit diversity scheme uses two transmitter antennas and one receiver antenna. The transmitters, according to this diversity scheme, encode and transmit a sequence of information symbols. The receiver includes a combining scheme that combines the two transmitted sequences and a decision rule for a maximum likelihood detection.

According to the conventional two-branch transmit diversity scheme, two symbols are encoded with a complex orthogonal code. The encoder output is transmitted in two consecutive transmission periods from two transmit antennas. At a given symbol period, two signals are simultaneously transmitted from the two antennas. At time t, the signal transmitted from antenna one is denoted by $x_1$, and the signal transmitted from antenna two is donated by $x_2$. During next symbol period signal $(-x_2^*)$ is transmitted from antenna one, and signal $x_1^*$ is transmitted from antenna two, where * is the complex conjugate operation. Table 3 illustrates the transmission from respective antennas during the two symbol periods.

TABLE 4

Encoding and transmission sequence for two-branch transmit diversity scheme

|  | Antenna 1 | Antenna 2 |
|---|---|---|
| Time t | $x_1$ | $-x_2^*$ |
| Time t + T | $x_2$ | $x_1^*$ |

Assuming that the fading coefficient are constant over the two consecutive symbols, the received signal over the two symbol periods can be written as shown in equation (5):

$$r_1 = h_1 x_1 + h_2 x_2 + n_1$$

$$r_2 = -h_1 x_2^* + h_2 x_1^* + n_2 \quad (5)$$

where $h_1$ and $h_2$ are the channel fading coefficients for channels from the transmission antennas one and two to the receiver antenna, respectively, and $n_1$ and $n_2$ are complex random variables representing receiver noise and interference.

Assuming the channel fading coefficients are constant and can be perfectly recovered, the received two signals can be combined as shown in equation (6):

$$\hat{x}_1 = h_1^* r_1 + h_2 r_2^* \quad (6)$$
$$= (|h_1|^2 + |h_2|^2) x_1 + h_1^* n_1 + h_2 n_2^*$$
$$\hat{x}_2 = h_2^* r_1 - h_1 r_2^*$$
$$= (|h_1|^2 + |h_2|^2) x_2 - h_1 n_2^* + h_2^* n_1$$

The combined signals may then be provided to a maximum likelihood detector to determine a decision statistic from the combined signals. A decision rule may be applied to the decision statistic to detect the two symbols.

It is known that if a p×n complex generalized linear processing orthogonal matrix $X_c$, with complex variables $x_1$, $x_1, \ldots, x_k$, satisfies equation (7), then matrix $X_c$ can provide full transmit diversity.

$$X_c X_c^H = (|x_1|^2 + |x_2|^2 + \ldots + |x_k|^2) * I \quad (7)$$

It can be shown that the two-branch transmit diversity scheme satisfies equation (7) because $$\begin{pmatrix} x_1 & -x_2^* \\ x_2 & x_1^* \end{pmatrix} \begin{pmatrix} x_1^* & x_2^* \\ -x_2 & x_1 \end{pmatrix} = \begin{pmatrix} |x_1|^2 + |x_2|^2 & 0 \\ 0 & |x_1|^2 + |x_2|^2 \end{pmatrix} \quad (8)$$

The two-branch transmit diversity scheme, therefore, may provide full transmit diversity.

For Data Rates of 320 Mbps and Higher

In the conventional MB-OFDM system, the DCM scheme spreads each bit onto two tones and four bits onto a two-tone pair. It is expected that the two tones experience different fading so that frequency diversity may be obtained. This scheme achieves optimal diversity in terms of a single transmission at a level of complexity comparable to conventional QPSK.

Further analysis indicates, however, that in retransmission, simply repeating the DCM may not achieve an optimal performance. If the two tones encounter different fading, the four bits may have different energies captured at the receiver. In this case, diversity gain may not be fully achieved.

Assume that the received signals from the two tones described in equations (1) and (2) are given by equation (9) as:

$$\begin{cases} r_n = h_n y_n + n_n \\ r_{n+50} = h_{n+50} y_{n+50} + n_{n+50} \end{cases} \quad (9)$$

where $h_n$ and $h_{n+50}$ are channel fading coefficients on two tones, $n_n$ and $n_{n+50}$ are additive white Gaussian noise and they are independent from each other.

If the channel fading coefficients can be perfectly recovered at the receiver, the decision statistics of maximum likelihood decoder may be obtained as shown in equation (10):

$$\hat{y}_n = h_n^* r_n \quad (10)$$
$$= |h_n|^2 y_n + h_n^* n_n$$
$$\hat{y}_{n+50} = h_{n+50}^* r_{n+50}$$
$$= |h_{n+50}|^2 y_{n+50} + h_{n+50}^* n_{n+50}$$

If the two transmissions from the two-tone pair are treated as a type of space-time coding, a code matrix (equation (7)) may be determined as shown in equation (11):

$$\begin{pmatrix} y_n & y_n \\ y_{n+50} & y_{n+50} \end{pmatrix} \begin{pmatrix} y_n^* & y_n^* \\ y_{n+50}^* & y_{n+50}^* \end{pmatrix} = \begin{pmatrix} 2|y_n|^2 & 2 y_n y_{n+50}^* \\ 2 y_n^* y_{n+50} & 2|y_{n+50}|^2 \end{pmatrix} \quad (11)$$

Because the above equation does not satisfy condition given in equation (8), the combination of the two transmissions does not provide full diversity.

The varying bit reliabilities evolve from the constraint of two-dimensional signal constellation mapping, where modulation schemes carrying more than 2 bits per symbol cannot have the same mean reliabilities for all bits under the assumption that all symbols are equally likely to be transmitted. Bits mapped onto the symbols may differ from each other in mean reliability.

Figure 5:
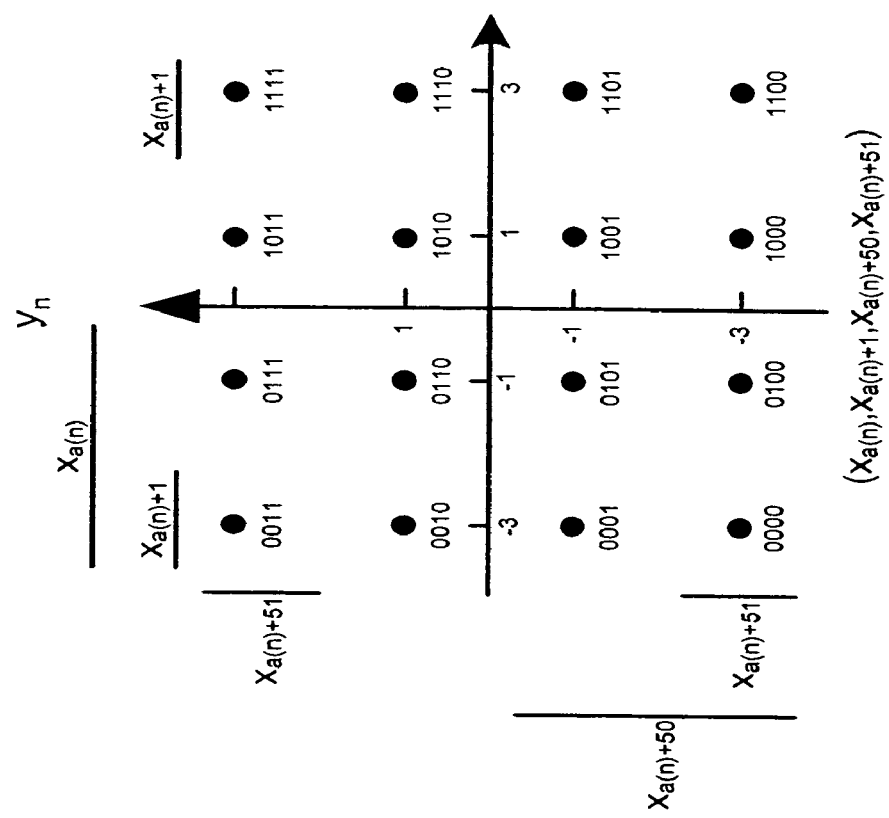
FIG. 5 (Prior Art) is a constellation of a conventional DCM illustrating a mean bit reliability within the constellation.

FIG. 5 is a constellation of a conventional DCM scheme illustrating a mean bit reliability within the constellation. In this figure, $y_n$ is used to illustrate the mean bit reliability. Bits $X_{a(n)}$ and $X_{a(n)+50}$ have a high mean reliability because, as these bits are mapped to half spaces of the signal constellation diagram, their reliability is independent of whether the bit is one or a zero. In contrast, bits $X_{a(n)+1}$ and $X_{a(n)+51}$ have a low mean reliability, as their reliability depends on whether they are one or a zero. For example, for bits $X_{a(n)+1}$, ones are mapped to inner columns, whereas zeros are mapped to outer columns. Similarly for $X_{a(n)+51}$, ones are mapped to inner columns, whereas zeros are mapped to outer columns.

The bit reliabilities within symbols may be in a constant ratio over all retransmissions, i.e., bits which have been less reliable from previous received transmissions will still be less reliable after receiving further transmissions. Similarly, bits which have been more reliable from previous received transmissions will still be more reliable after receiving further transmissions. For the second and each further retransmission, the bit reliabilities may stay in a constant ratio relative to each other. This is defined by the signal constellation employed in the first transmission, i.e., bits $X_{a(n)}$ and $X_{a(n)+50}$ have a higher mean reliability than bits $X_{a(n)+1}$ and $X_{a(n)+51}$ after any number of retransmissions.

If the symbols $y_{n+50}$ encounter deep fading, bits $X_{a(n)}$, $X_{a(n)+1}$, $X_{a(n)+50}$ and $X_{a(n)+51}$ all rely on symbols $y_n$, and the retransmission of $y_n$. A difference in the mean reliability of bits may affect the final performance.

For Data Rates of 200 Mbps and Lower

For data rates of 200 Mbps and lower, time-domain diversity may be utilized as described above. In time-domain spreading, symbols are transmitted twice. In the second OFDM symbol, complex symbols have an inverse positioned on the sub-carriers, where inverse positioned refers to the channel separation between tone-pairs, i.e., the relationship of j=99−i, where i and j are the respective first and second tones of the tone-pair. The real and imaginary parts are swapped and multiplied with a member of a pseudo-random sequence. Because there are 100 tones assigned for information data, if the original transmission is on a two-tone pair as $$\begin{pmatrix} y_n \\ y_{99-n} \end{pmatrix},$$

retransmission is done as $$\begin{pmatrix} -y^*_{99-n} \\ y^*_n \end{pmatrix}, \text{ where } n = 0, \ldots, 99.$$

With the same assumption on channels, signals from the two tones can be given as the original transmission, in equation (12), and retransmission, in equation (13):

$$\begin{cases} r_{n,1} = h_n y_n + n_{n,1} \\ r_{99-n,1} = h_{99-n} y_{99-n} + n_{99-n,1} \end{cases} \quad (12)$$

$$\begin{cases} r_{n,2} = -h_n y^*_{99-n} + n_{n,2} \\ r_{99-n,2} = h_{99-n} y^*_n + n_{99-n,2} \end{cases} \quad (13)$$

where $h_n$ and $h_{99-n}$ are channel fading coefficients on two tones, $n_{n,i}$ and $n_{99-n,i}$, for i=1, 2, are each independent additive white Gaussian noise.

If the channel fading coefficients can be perfectly recovered at the receiver, the decision statistics of the maximum likelihood decoder can be obtained as shown in equation (14) as:

$$\hat{y}_n = h^*_n r_{n,1} + h_{99-n} r^*_{99-n,2} \quad (14)$$

$$= (|h_n|^2 + |h_{99-n}|^2) y_n + h^*_n n_{n,1} + h_{99-n} n^*_{99-n,2}$$

Because the transmit matrix satisfies equation (7), i.e., $$\begin{pmatrix} y_n & -y^*_{99-n} \\ y_{99-n} & y^*_n \end{pmatrix} \begin{pmatrix} y^*_n & y^*_{99-n} \\ -y_{99-n} & y_n \end{pmatrix} = \quad (15)$$

$$\begin{pmatrix} |y_n|^2 + |y_{99-n}|^2 & 0 \\ 0 & |y_n|^2 + |y_{99-n}|^2 \end{pmatrix}$$

full diversity may be obtained.

The two-tone pairs, however, do not have a same channel separation. For example, in the following two cases shown in equation (16), the channel separation is 1 channel and 99 channels respectively:

n=49, 99−n=50 Δchannel=1 n=0 99−n=99 Δchannel=99 (16)

If channels are too close, the channel variation may be correlated, meaning that a difference in fading of these channels may be very small. A small channel variation may result in a small frequency diversity for spreading.

Although DCM can achieve frequency diversity in a single transmission, in which 4 bits are mapped onto two-tone pair and each bit is mapped onto two tones, decisions may be affected by the channel fading coefficients.

Spreading Scheme with Tones Treated as Antennas

In MB-OFDM UWB systems, each tone takes 4 MHz of bandwidth. Because the wireless channel for home networking exhibits frequency selective fading, particularly for UWB systems, different tones of the above bandwidth may experience different fading characteristics such that each fading characteristic is independent of any other. Because of this, the inventors have determined that each tone can be treated as an antenna.

Table 2 indicates that 4 bits are mapped onto a two-tone pair separated by 50 data tones. In an exemplary embodiment, the remaining 28 tones are used as pilot tones and/or guard tones. These 28 tones may be evenly distributed among the 128 tones. Each two-tone pair, therefore, can be considered as being separated by 64 tones, which is equivalent to 256 MHz. Due to the wide separation of this two-tone pair in the frequency domain, these two tones can be treated as being independent from each other and subject to different fading characteristics. The two tones can, therefore, be treated as two different antennas. Accordingly, the 4 bits can be considered as being transmitted from two independent antennas. The type of system can generally be considered a Single Input Single Output (SISO) MB-OFDM system.

According to an exemplary embodiment, the tone-pairs may be treated as being transmitted from independent antennas. By treating the tone-pair as being transmitted from independent antennas, the principle of time space coding, which is widely used in MIMO systems, can be applied to the above SISO MB-OFDM systems.

Figure 6:
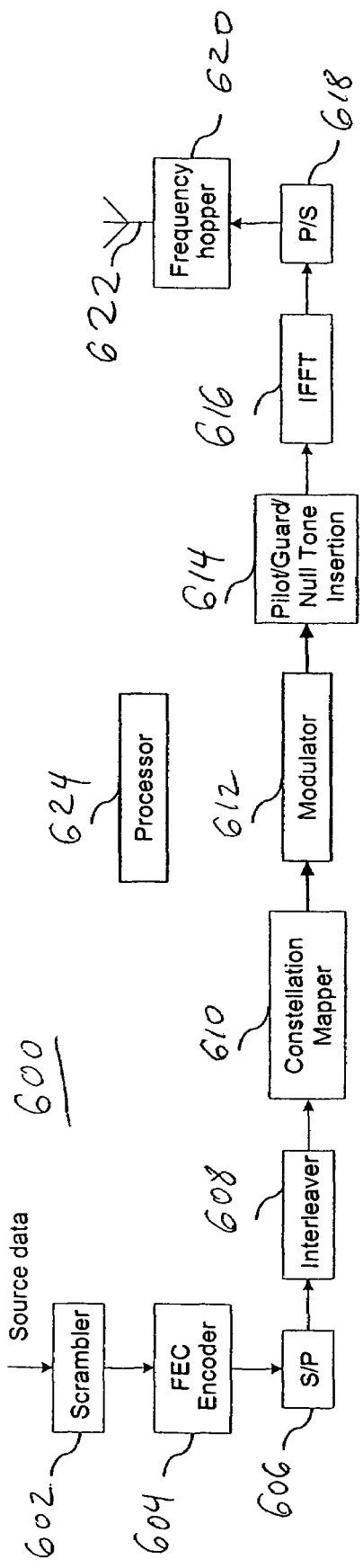
FIG. 6 is a system diagram illustrating an exemplary transmitter according to the present invention.

FIG. 6 is a system diagram illustrating an exemplary transmitter 600 according to the present invention. The illustrated transmitter 600 includes a scrambler 602, an FEC encoder 604, a serial-to-parallel (S/P) converter 606, an interleaver 608, a constellation mapper 610, a modulator 612, a pilot/guard/null tone inserter 614, an inverse fast Fourier transform (IFFT) processor 616, a parallel-to-serial (P/S) converter 618, a frequency hopper 620, and an antenna 622. All of these component may be controlled by a processor 624. For the sake of clarity, connections between the processor 624 and the elements of the transmitter 600 are not shown in FIG. 6. Suitable components for use within the transmitter 600 will be understood by one of skill in the art from the description herein.

The scrambler 602 scrambles the source data. The scrambler 602 may use, for example, a Linear Feedback Shift Register (LFSR) to generate a pseudo random binary sequence (PRBS). The FEC encoder 604 introduces error correction to the source data. The S/P converter 606 converts the error corrected source data from serial to parallel. Suitable techniques for FEC encoding and S/P conversion will be understood by one of skill in the art from the description herein.

The interleaver 608 rearranges the data to separate consecutive bits of data. A different interleaver pattern may be used for the transmission of a frame and each subsequent retransmission of that frame. The interleaving pattern is a function of the number of retransmissions and may be predefined.

The constellation mapper 610 spreads symbols over multiple tones for transmission and retransmission of the symbols. In an exemplary embodiment, first and second symbols are mapped to respective first and second 16-QAM constellations. The mapping to the second N-QAM constellation is desirably different from the mapping to the first N-QAM constellation. Upon retransmission, the first symbol is mapped to the second 16-QAM constellation using the second mapping and the second symbol is mapped to the first 16-QAM constellation using the first mapping. Although a 16-QAM modulation is described, it is contemplated that a symbol may be mapped to an N-QAM constellation, where N is a power of two and greater than or equal to two.

The modulator 612 applies OFDM modulation. The complex symbols generated by the constellation mapper 610 are applied to an OFDM modulation scheme so that the first and second N-QAM constellations modulate corresponding first and second tones. The pilot/guard/null tone inserter 614 inserts pilot, guard, and null tones into the data. The IFFT processor 616 transforms the modulated data from the frequency domain to the time domain. The P/S converter 618 converts the data from parallel to serial for transmission. The frequency hopper 620 processes the serial data for transmission from the antenna 622. The frequency hopper 620 may include a digital-to-analog converter (DAC) for converting digital data to analog for transmission. Alternatively, digital to analog conversion may be performed at other locations within the transmitter 600. Suitable techniques for pilot/guard/null tone insertion, IFFT transformation, parallel to serial conversion, and frequency hopping for use with the present invention will be understood by one of skill in the art from the description herein.

Figure 7:
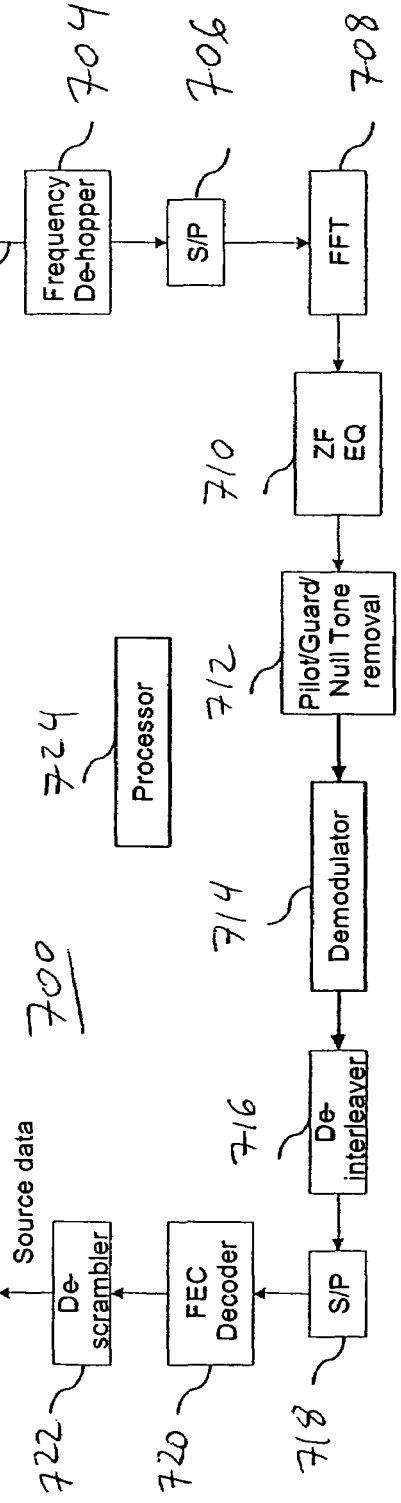
FIG. 7 is a system diagram illustrating an exemplary receiver according to the present invention.

FIG. 7 is a system diagram illustrating an exemplary receiver 700 according to the present invention. The illustrated receiver 700 includes another antenna 702, a frequency de-hopper 704, a S/P converter 706, a fast Fourier transform (FFT) converter 708, a Zero-Forcing Equalizer (ZFEQ) 710, a pilot/guard/null tone remover 712, a demodulator 714, a de-interleaver 716, a P/S converter 718, an FEC decoder-720, and a de-scrambler 722. All of these components may be controlled by a processor 724. For the sake of clarity, connections between the processor 724 and the elements of the receiver 700 are not shown in FIG. 7. Suitable components for use within the receiver 700 will be understood by one of skill in the art from the description herein.

The frequency de-hopper 704 follows the frequency hopping used by the transmitter 600 to receive a signal transmitted by the transmitter 600 (FIG. 6) via the antenna 702. The S/P converter 706 converts the received signal from serial to parallel for processing. The FFT converter 708 converts the signal from the time domain to the frequency domain. The ZFEQ 710 equalizes the signal to adjust for any phase and/or amplitude distortion introduced by the channel. The pilot/guard/null tone remover 712 removes pilot, guard, and null tones. The demodulator 714 reverses the modulation introduced by the modulator 612 and detects the symbols transmitted and retransmitted according to the constellation mapper 610 (FIG. 6). The de-interleaver 716 reverses the interleaving introduced by the interleaver 608 (FIG. 6). The P/S converter 718 converts the signal from parallel to serial. The FEC decoder 720 decodes the signal. The de-scrambler 722 reverses the scrambling introduced by the scrambler 602 (FIG. 6).

The frequency de-hopper 704 may include an analog-to-digital converter (ADC) for converting received analog signals to digital signals. Alternatively, analog to digital conversion may be performed at other locations within the receiver 700.

Figure 8:
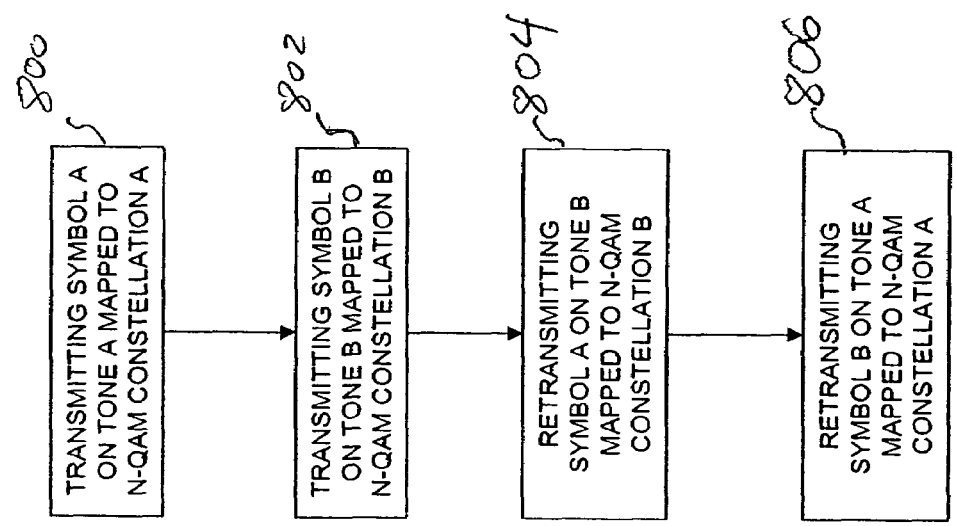
FIG. 8 is a flow chart illustrating an exemplary method for transmitting symbols according to the present invention.

FIG. 8 is a flow chart illustrating an exemplary method for transmitting symbols, for example, using constellation mapper 610 of transmitter 600 (FIG. 6). In step 800, symbol A is transmitted on tone A mapped to N-QAM constellation A. In step 802, symbol B is transmitted on tone B mapped to N-QAM constellation B. Although FIG. 8 shows steps 800 and 802 as being performed sequentially, it is contemplated that steps 800 and 802 may be performed simultaneously so as to transmit a two-tone pair.

In step 804, symbol A is retransmitted on tone B mapped to N-QAM constellation B. In step 806, symbol B is retransmitted on tone A mapped to N-QAM constellation A. Although FIG. 8 shows steps 804 and 806 as being performed sequentially, it is contemplated that steps 804 and 806 may be performed simultaneously so as to retransmit a two-tone pair.

Figure 9:
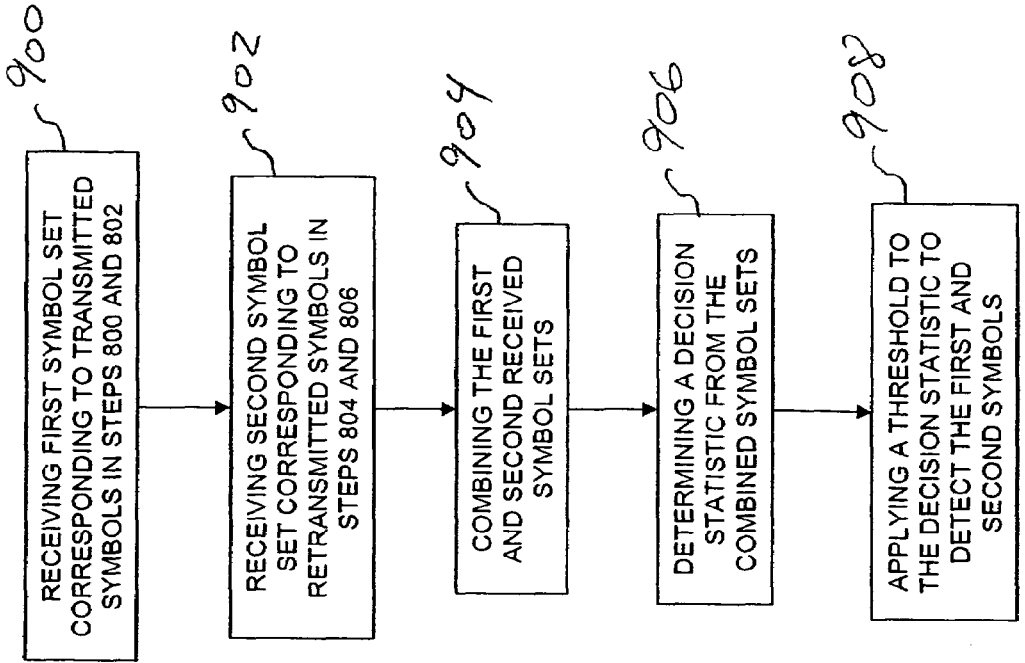
FIG. 9 is a flow chart illustrating an exemplary method for detecting received symbols according to the present invention.

FIG. 9 is a flow chart illustrating an exemplary method for detecting received symbols, for example using demodulator 714 or receiver 700 (FIG. 7). In step 900, a first symbol set (i.e. tone-pair) is received corresponding to the transmitted symbols in steps 800 and 802 (FIG. 8). In step 902, a second symbol set is received corresponding to the retransmitted symbols in steps 804 and 806 (FIG. 8).

In step 904, the symbol sets of steps 900 and 902 are combined to form combined signals (described further below). In step 906, a decision statistic is determined from the combined signals. In step 908, a threshold is applied to the decision statistic according to a decision rule to detect the first and second symbols.

A detailed description of the exemplary constellation mapping scheme and corresponding frequency diversity are described below. If the original transmission is on a two-tone pair as $$\begin{pmatrix} y_n \\ y_{n+50} \end{pmatrix},$$

retransmission, according to an exemplary embodiment, may be performed as $$\begin{pmatrix} -y^*_{n+50} \\ y^*_n \end{pmatrix}.$$

Because MB-OFDM may be designed for home networking, each channel can be considered as being constant during the two transmissions (i.e., transmission and retransmission). Signals from the two tones are given by equation (17) for the original transmission and equation (18) for the retransmission:

$$\begin{cases} r_{n,1} = h_n y_n + n_{n,1} \\ r_{n+50,1} = h_{n+50} y_{n+50} + n_{n+50,1} \end{cases} \quad (17)$$

$$\begin{cases} r_{n,2} = -h_n y_{n+50}^* + n_{n,2} \\ r_{n+50,2} = h_{n+50} y_n^* + n_{n+50,2} \end{cases} \quad (18)$$

where $h_n$ and $h_{n+50}$ are channel fading coefficients on two tones, $n_{n,i}$ and $n_{n+50,i}$, for $i=1, 2$, are each independent additive white Gaussian noise signals.

If the channel fading coefficients can be perfectly recovered at the receiver, the decision statistics of maximum likelihood decoder may be obtained as shown in equation (19):

$$\hat{y}_n = h_n^* r_{n,1} + h_{n+50} r_{n+50,2}^* \quad (19)$$
$$= (|h_n|^2 + |h_{n+50}|^2) y_n + h_n^* n_{n,1} + h_{n+50} n_{n+50,2}^*$$

$$\hat{y}_{n+50} = h_{n+50}^* r_{n+50,1} - h_n r_{n,2}^*$$
$$= (|h_n|^2 + |h_{n+50}|^2) y_{n+50} + h_{n+50}^* n_{n+50,1} - h_n n_{n,2}^*$$

Because the transmit matrix satisfies equation (7), i.e., because $$\begin{pmatrix} y_n & -y_{n+50}^* \\ y_{n+50} & y_n^* \end{pmatrix} \begin{pmatrix} y_n^* & y_{n+50}^* \\ -y_{n+50} & y_n \end{pmatrix} = \begin{pmatrix} |y_n|^2 + |y_{n+50}|^2 & 0 \\ 0 & |y_n|^2 + |y_{n+50}|^2 \end{pmatrix} \quad (20)$$

the system can provide full diversity. Note that both symbols $y_n$ and $y_{n+50}$ receive the same gain in their estimate, i.e., $|h_1|^2 + |h_2|^2$. Therefore, as long as one tone does not experience severe channel fading, both symbols may have sufficient energy to be detected by the maximum likelihood detector.

The performance with respect to total signal energy of the exemplary scheme can be compared with that of the conventional scheme. The total signal energy in the conventional system and this system are compared in equation (21):

$$Y_{old} = 2(|h_n|^2 |y_n|^2 + |h_{n+50}|^2 |y_{n+50}|^2)$$

$$Y_{new} = (|h_n|^2 + |h_{n+50}|^2)(|y_n|^2 + |y_{n+50}|^2) \quad (21)$$

If $|h_n| \approx |h_{n+50}| = H$, the signal energy are approximately evenly distributed on two tones and the total signal energies are almost the same. The total signal energies can be described by equation (22):

$$Y_{old} \approx 2H(|y_n|^2 + |y_{n+50}|^2)$$

$$Y_{new} \approx 2H(|y_n|^2 + |y_{n+50}|^2) \quad (22)$$

However, if $|h_n| \ll |h_{n+50}|$ and thus the contribution of $y_n$ may be neglected, equation (21) may be approximated by equation (23):

$$Y_{old} \approx 2|h_{n+50}|^2 |y_{n+50}|^2$$

$$Y_{new} \approx |h_{n+50}|^2 (|y_n|^2 + |y_{n+50}|^2) \quad (23)$$

Assuming that the signal energy on each tone is statistically the same, i.e., that $$|y_n|^2 = |y_{n+50}|^2 = Y \quad (24)$$

equation (23) becomes:

$$Y_{old} \approx 2|h_{n+50}|^2 Y$$

$$Y_{new} \approx 2|h_{n+50}|^2 Y \quad (25)$$

Based on equations (23)-(25), the total energy of the exemplary and conventional systems on the two tones are statistically the same regardless of the fading coefficients of each tone. Furthermore, if two tones experience similar channel fading, the total energy of the exemplary and conventional systems may be evenly distributed on two tones. In addition, if two tones encounter different channel fading, the total energy of the conventional system comes mainly from one tone while the total energy of the exemplary system are distributed on two tones. Finally, the exemplary system has better diversity gain as compared with the conventional system.

The mean reliability may also be examined. Referring back to FIG. 5, as described above, $X_{a(n)}$ and $X_{a(n)+50}$ have a high mean reliability in $Y_n$. Similarly, $X_{a(n)+1}$ and $X_{a(n)+51}$ have a high mean reliability in $Y_{n+50}$. Because of this, (see equation (23)), all bits in $Y_{new}$ receive the same level of mean reliability.

Another Retransmission Scheme

A major difference between the MB-OFDM systems and true MIMO systems, with respect to the design of a space-time code, is that, in true MIMO systems, the receiver cannot separate signals transmitted from two antennas. In contrast, in MB-OFDM systems, the receiver can separate signals transmitted from two tones. Due to this difference, another embodiment of the encoding scheme can be represented as described below.

If the original transmission on a two-tone pair is $$\begin{pmatrix} y_n \\ y_{n+50} \end{pmatrix},$$

the retransmission may be provided as $$\begin{pmatrix} y_{n+50} \\ y_n \end{pmatrix}.$$

The received signals from the two tones are given as original transmission in equation (26) and as retransmission in equation (27):

$$\begin{cases} r_{n1} = h_n y_n + n_{n,1} \\ r_{n+50,1} = h_{n+50} y_{n+50} + n_{n+50,1} \end{cases} \quad (26)$$

-continued $$\begin{cases} r_{n,2} = h_n y_{n+50} + n_{n,2} \\ r_{n+50,2} = h_{n+50} y_n + n_{n+50,2} \end{cases} \quad (27)$$

where $h_n$ and $h_{n+50}$ are channel fading coefficients on two tones and $n_{n,i}$ and $n_{n+50,i}$, for i=1, 2, are each independent additive white Gaussian noise signals.

If the channel fading coefficients can be recovered perfectly at the receiver, the decision statistics of maximum likelihood decoder can be obtained as given by equation (28):

$$\begin{aligned} \hat{y}_n &= h_n^* r_{n,1} + h_{n+50}^* r_{n+50,2} \\ &= (|h_n|^2 + |h_{n+50}|^2) y_n + h_n^* n_{n,1} + h_{n+50}^* r_{n+50,2} \\ \hat{y}_{n+50} &= h_{n+50}^* r_{n+50,1} + h_n^* r_{n,2} \\ &= (|h_n|^2 + |h_{n+50}|^2) y_{n+50} + h_{n+50}^* n_{n+50,1} + h_n^* n_{n,2} \end{aligned} \quad (28)$$

Because equation (28) is equivalent to equation (19), the analysis corresponding to equations (21)-(25), described above, apply to this further embodiment of the exemplary system. Accordingly, this further embodiment achieves an equivalent diversity gain as the above exemplary system. The above analysis indicates that in the MF-OFDM systems, space-time codes may be used to achieve the equivalent results.

Spreading Scheme for 200 Mbps and Lower Rate

For data rates of less than or equal to 200 Mbps, two-tone pairs, according to the conventional method, do not have same channel separation. Channels in some two-tone pairs are very close so that they may experience small channel variation. In order to provide a large and consistent channel separation, a further exemplary embodiment uses the scheme shown in equation (29) for channel separation.

$$\begin{cases} y_n = \frac{1}{\sqrt{2}} (x_{a(n)} + j x_{a(n)+50}) \\ y_{n+50} = \frac{1}{\sqrt{2}} (x_{a(n)+1} + j x_{a(n)+51}) \end{cases} \quad (29)$$

Figure 10A:
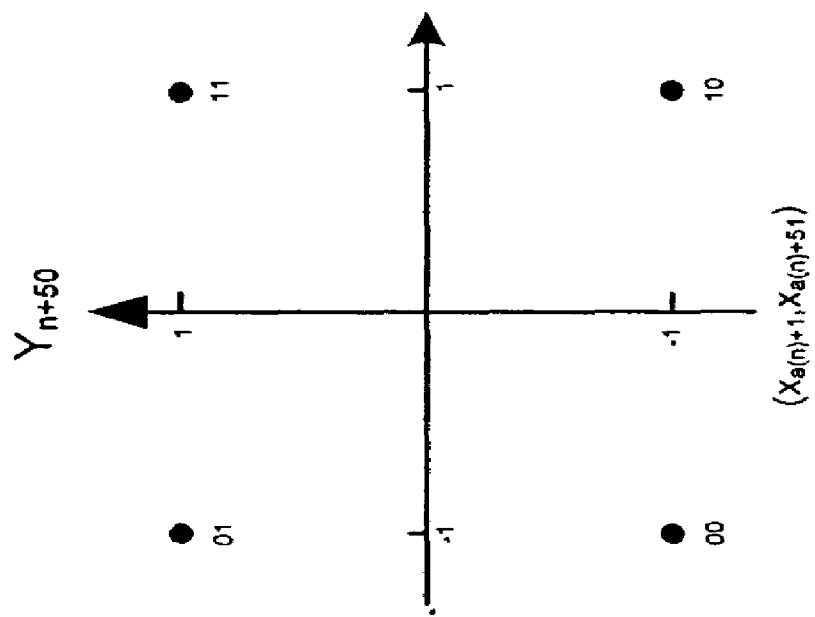
FIGS. 10A and 10B are portions of exemplary constellations generated according to an exemplary embodiment of the present invention.
Figure 10B:
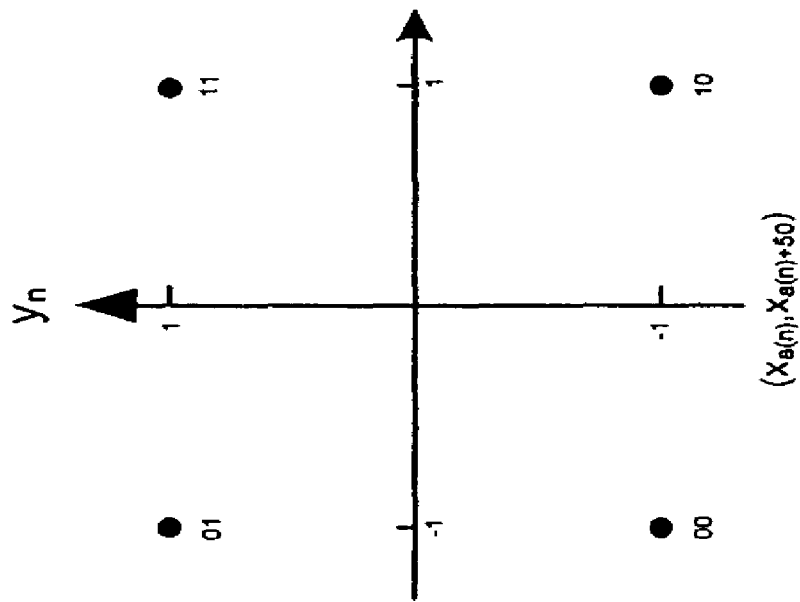

The constant $\sqrt{2}$ is used to normalize the transmission power. This can be explained in FIGS. 10A and 10B. In these figures, $(x_{a(n)}, x_{a(n)+50})$ and $(x_{a(n)+1}, x_{a(n)+51})$ are mapped onto one constellation point. The values '1/0' in FIG. 10 correspond to '1/−1' in equation (29). Equation (29) maps 4 bits into 2 QPSK constellations (i.e. two 4-QAM constellations). Because there is only one constellation point in each quadrant, an average energy can be calculated as:

$$\Sigma = (1^2 + 1^2) = 2 \quad (30)$$

If the original transmission is $$\begin{pmatrix} y_n \\ y_{n+50} \end{pmatrix}$$

and the retransmission is $$\begin{pmatrix} y_{n+50} \\ y_n \end{pmatrix},$$

similar to equation (14), an exemplary combining scheme is shown in equation (31):

$$\begin{aligned} \hat{y}_n &= h_n^* r_{n,1} + h_{n+50}^* r_{n+50,2} \\ &= (|h_n|^2 + |h_{n+50}|^2) y_n + h_n^* n_{n,1} + h_{n+50}^* r_{n+50,2} \\ \hat{y}_{n+50} &= h_{n+50}^* r_{n+50,1} + h_n^* r_{n,2} \\ &= (|h_n|^2 + |h_{n+50}|^2) y_{n+50} + h_{n+50}^* n_{n+50,1} + h_n^* n_{n,2} \end{aligned} \quad (31)$$

Similarly, because equation (31) is equivalent to equation (19), the analysis described above corresponding to equations (21)-(25) also apply to this exemplary system for data rates of less than or equal to 200 Mbps. Accordingly, a data rate of the system may be determined. If the data rate is less than 200 Mbps, a size of the first and second symbols may be reduced. In addition, a number of points in the first and second constellations may be reduced.

Performance in Time Varying Environment

A further embodiment of the present invention is provided for time-varying environments. For time varying environments, channel parameters may keep changing.

For the conventional system, $$\begin{cases} r_{n,1} = h_{n,1} y_n + n_{n,1} \\ r_{n+50,1} = h_{n+50,1} y_{n+50} + n_{n+50,1} \end{cases} \quad (32)$$

$$\begin{cases} r_{n,2} = h_{n,2} y_n + n_{n,2} \\ r_{n+50,2} = h_{n+50,2} y_{n+50} + n_{n+50,2} \end{cases} \quad (33)$$

If the channel fading coefficients can be perfectly recovered at the receiver, the decision statistics of maximum likelihood decoder for the conventional system are:

$$\begin{aligned} \hat{y}_n &= h_{n,1}^* r_{n,1} + h_{n,2}^* r_{n,2} \\ &= (|h_{n,1}|^2 + |h_{n,2}|^2) y_n + h_{n,1}^* n_{n,1} + h_{n,2}^* n_{n,2} \\ \hat{y}_{n+50} &= h_{n+50,1}^* r_{n+50,1} + h_{n+50,2}^* r_{n+50,2} \\ &= (|h_{n+50,1}|^2 + |h_{n+50,2}|^2) y_{n+50} + \\ &\quad h_{n+50,1}^* n_{n+50,1} + h_{n+50,2}^* n_{n+50,2} \end{aligned} \quad (34)$$

For the exemplary system, $$\begin{cases} r_{n,1} = h_{n,1} y_n + n_{n,1} \\ r_{n+50,1} = h_{n+50,1} y_{n+50} + n_{n+50,1} \end{cases} \quad (35)$$

$$\begin{cases} r_{n,2} = h_{n,2} y_{n+50} + n_{n,2} \\ r_{n+50,2} = h_{n+50,2} y_n + n_{n+50,2} \end{cases} \quad (36)$$

If the channel fading coefficients can be perfectly recovered at the receiver, the decision statistics of maximum likelihood decoder for the exemplary system are given by equation (37):

$$\hat{y}_n = h_n^* r_{n,1} + h_{n+50,2}^* r_{n+50,2} \quad (37)$$
$$= (|h_{n,1}|^2 + |h_{n+50,2}|^2) y_n + h_{n,1}^* n_{n,1} + h_{n+50,2}^* r_{n+50,2}$$

$$\hat{y}_{n+50} = h_{n+50,1}^* r_{n+50,1} + h_{n,2}^* r_{n,2}$$
$$= (|h_{n,2}|^2 + |h_{n+50,1}|^2) y_{n+50} + h_{n+50,1}^* n_{n+50,1} + h_{n,2}^* n_{n,2}$$

Comparing the two solutions given in equations (34) and (37), it is difficult to determine which system exhibits superior performance because the channel varying. However, statistically speaking, the inventors have determined that the performance of the two solutions is very close.

Although the invention has been described in terms of a UWB multi-band communication system, it is contemplated that the it may be implemented in software on microprocessors/general purpose computers (not shown). In various embodiments, one or more of the functions of the various components may be implemented in software that controls a general purpose computer. This software may be embodied in a computer readable medium, for example, a magnetic or optical disk, or a memory-card.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for transmitting symbols in a communication system having a plurality of frequency bands, each frequency band including a plurality of tones, the method comprising the steps of:
    transmitting a first symbol on a first tone using a first constellation mapping and a second symbol on a second tone using a second constellation mapping different from the first constellation mapping the second tone different from the first tone, the first and second symbols selected from among the symbols, the first and second tones selected from among the plurality of tones; and
    retransmitting the first symbol on the second tone using the second constellation mapping and the second symbol on the first tone using the first constellation mapping.

2. The method according to claim 1, wherein a predetermined tone separation is provided between the first and second tones, the predetermined tone separation being constant over the plurality of tones.

3. The method according to claim 1, the step of retransmitting further including the steps of retransmitting a negative complex conjugate of the second symbol and retransmitting a complex conjugate of the first symbol.

4. The method according to claim 1, further including a step of determining a data rate of the communication system,
    wherein when the data rate is greater than a first data rate, the steps of transmitting and retransmitting include using the first and second constellation mappings where each of the first and second constellation mappings are N-QAM constellations, where N is a power of two and greater than or equal to two, and
    when the data rate is less than a second data rate, the second data rate being less than the first data rate, the steps of transmitting and retransmitting include reducing a size of the first and second symbols and using the first and second constellation mappings where each of the constellation mappings are M-QAM constellations, where M is less than N.

5. A computer-readable medium encoded with a computer program which when executed causes a computer to perform the method according to claim 1.

6. A method for detecting symbols in a communication system having a plurality of frequency bands, each frequency band including a plurality of tones, the method comprising the steps of:
    demapping a first set of signals corresponding to first and second symbols mapped using respective first and second constellation mappings, the second constellation mapping different from the first constellation mapping, the first and second symbols selected from among the symbols;
    demapping a second set of signals corresponding to the first and second symbols mapped using the respective second and first constellation mappings;
    combining the first and second sets of demapped signals to form a combined signal; and
    detecting the first and second symbols from the combined signal.

7. The method according to claim 6, the step of detecting the first and second symbols further comprising the step of determining a decision statistic from the combined signal and applying a predetermined threshold to the decision statistic to detect the first and second symbols.

8. A computer-readable medium encoded with a computer program which when executed causes a computer to perform the method according to claim 6.

9. A data transmission apparatus, the data transmission apparatus including a transmitter for transmitting symbols in a plurality of frequency bands, each frequency band including a plurality of tones, the data transmission apparatus comprising:
    a constellation mapper for 1) mapping first and second symbols using respective first and second constellation mappings to modulate respective first and second tones for transmitting the first and second symbols by the transmitter, the second constellation mapping different from the first constellation mapping the second tone different from the first tone, and 2) mapping the first and second symbols using the respective second and first constellation mappings to modulate the corresponding second and first tones for retransmitting the first and second symbols by the transmitter, the first and second symbols selected from among the symbols, the first and second tones selected from among the plurality of tones.

10. Apparatus according to claim 9, wherein the first and second tones include a frequency separation of 256 MHz.

11. Apparatus according to claim 9, wherein a predetermined tone separation is provided between the first and second tones, the predetermined tone separation being constant over the plurality of tones.

12. Apparatus according to claim 11, wherein the predetermined tone separation is 50 tones.

13. Apparatus according to claim 11, wherein the predetermined tone separation is 64 tones.

14. A data reception apparatus, the data reception apparatus including a receiver for receiving a first set of signals and a second set of signals in a communication system having a plurality of frequency bands, each frequency band including a plurality of tones, the data reception apparatus comprising:
    a demodulator including:
        a demapper for demapping the first and second sets of signals received by the receiver to form first and second demapped signals, the first set of signals corresponding to first and second symbols mapped using respective first and second constellation mappings, the second constellation mapping different from the first constellation mapping, the second set of symbols corresponding to the first and second symbols mapped using the respective second and first constellation mappings, the first and second symbols selected from among the symbols;

a combiner for combining the first and second demapped signals to form a combined signal; and a detector for detecting the first and second symbols from the combined signal.

15. A system, the system including a transmitter for transmitting a first set of signals and a second set of signals in a plurality of frequency bands and a receiver for receiving the first set of signals and the second set of signals transmitted by the transmitter, the system comprising:

a data transmission device comprising:

a constellation mapper for 1) mapping the first and second symbols using respective first and second constellation mappings to modulate corresponding first and second tones for transmitting the first and second symbols by the transmitter as the first set of signals, the second constellation mapping different from the first constellation mapping the second tone different from the first tone, and 2) mapping the first and second symbols using the respective second and first constellation mappings to modulate the respective second and first tones for retransmitting the first and second symbols by the transmitter as the second set of symbols, the first and second symbols selected from among the symbols, the first and second tones selected from among the plurality of tones; and a data reception device comprising:

a demodulator including:

a demapper for demapping the first and second sets of signals received by the receiver to form first and second demapped signals, a combiner for combining the first and second demapped signals to form a combined signal; and a detector for detecting the first and second symbols from the combined signal.

\* \* \* \* \*